United States Patent
Liu et al.

(10) Patent No.: US 9,940,105 B2
(45) Date of Patent: *Apr. 10, 2018

(54) SCALABLE CODE DIVISION AND WORKFLOW CHART

(71) Applicant: International Business Machines Corporation, Armonk, NY (US)

(72) Inventors: He Liu, Beijing (CN); DaFei Shi, Beijing (CN); Jia Sen Wu, Wuxi (CN); Bao Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

This patent is subject to a terminal disclaimer.

(21) Appl. No.: 14/867,052

(22) Filed: Sep. 28, 2015

(65) Prior Publication Data

US 2017/0090878 A1    Mar. 30, 2017

(51) Int. Cl.
*G06F 9/44* (2006.01)
*G06F 9/45* (2006.01)
*G06F 11/36* (2006.01)

(52) U.S. Cl.
CPC ............ *G06F 8/30* (2013.01); *G06F 8/72* (2013.01); *G06F 8/75* (2013.01); *G06F 8/20* (2013.01); *G06F 8/443* (2013.01); *G06F 11/3664* (2013.01)

(58) Field of Classification Search
CPC ... G06F 8/20; G06F 8/30; G06F 8/443; G06F 11/323; G06F 8/445; G06F 11/3664; G06F 11/3688
See application file for complete search history.

(56) References Cited

U.S. PATENT DOCUMENTS

| | | | |
|---|---|---|---|
| 7,174,536 B1 * | 2/2007 | Kothari ............... | G06F 11/3664 717/105 |
| 7,299,458 B2 | 11/2007 | Hammes | |
| 8,214,817 B2 | 7/2012 | Mendelson et al. | |
| 8,826,255 B1 | 9/2014 | Avadhanula et al. | |
| 8,893,102 B2 | 11/2014 | Keynes et al. | |
| 9,182,955 B1 * | 11/2015 | He ........................ | G06F 8/4435 |
| 9,286,196 B1 * | 3/2016 | Liu ....................... | G06F 11/3688 |
| 9,317,408 B2 * | 4/2016 | Szpak .................. | G06F 11/3688 |
| 2011/0258594 A1 * | 10/2011 | Syme ..................... | G06F 8/445 717/106 |
| 2011/0258610 A1 * | 10/2011 | Aaraj .................... | G06F 21/554 717/128 |

(Continued)

OTHER PUBLICATIONS

Verbelen et al., "Graph partitioning algorithms for optimizing software deployment in mobile cloud computing", Elsevier B.V., vol. 29, Issue 2, Feb. 2013, pp. 451-459; <http://www.sciencedirect.com/science/article/pii/S0167739X12001513>.*

Jalote et al., "Program Partitioning—A Framework for Combining Static and Dynamic Analysis", ACM, WODA'06, May 2006, pp. 11-16; <https://dl.acm.org/citation.cfm?id=1138916&CFID=999654335&CFTOKEN=49532319>.*

(Continued)

*Primary Examiner* — Thuy Dao
*Assistant Examiner* — Ben C Wang
(74) *Attorney, Agent, or Firm* — David Zwick (57) ABSTRACT

Generating a scalable code division and workflow chart. Based on definition-and-use cases of variables in a code snippet to be represented by a graph, crossing references to the variables in the code are determined, where a crossing reference associated with a statement involves a definition of the variable before the statement and a use of the variable at or after the statement. The code snippet is divided, based on the crossing references.

8 Claims, 6 Drawing Sheets

(56) References Cited

U.S. PATENT DOCUMENTS

| | | | | |
|---|---|---|---|---|
| 2012/0159458 | A1* | 6/2012 | Levanoni | G06F 8/51 717/136 |
| 2012/0167061 | A1* | 6/2012 | Kirovski | G06F 21/125 717/132 |
| 2012/0272220 | A1* | 10/2012 | Calcagno | G06F 8/77 717/125 |
| 2013/0159964 | A1* | 6/2013 | Szpak | G06F 11/3684 717/105 |
| 2013/0305211 | A1* | 11/2013 | Attar | G06F 11/3664 717/102 |
| 2014/0013309 | A1 | 1/2014 | Gounares | |
| 2014/0019949 | A1* | 1/2014 | Craymer | G06F 8/443 717/150 |
| 2014/0189650 | A1* | 7/2014 | Gounares | G06F 11/3636 717/125 |
| 2014/0189651 | A1* | 7/2014 | Gounares | G06F 11/3636 717/125 |
| 2015/0149988 | A1* | 5/2015 | Nakaike | G06F 8/433 717/156 |
| 2015/0180883 | A1* | 6/2015 | Aktas | H04L 63/145 726/23 |
| 2015/0220419 | A1* | 8/2015 | Cassez | G06F 11/3604 717/124 |
| 2015/0309813 | A1* | 10/2015 | Patel | G06F 8/75 703/22 |
| 2017/0316201 | A1* | 11/2017 | Yamada | G06F 9/4552 |

OTHER PUBLICATIONS

Nedhal A. Al-Saiyd, "Source Code Comprehension Analysis in Software Maintenance", IEEE, ICCCS, Jul. 2017, pp. 1-5; <http://ieeexplore.ieee.org/stamp/stamp.jsp?tp=&arnumber=8075175>.*

IBM: List of IBM Patents or Patent Applications Treated as Related (Appendix P), Mar. 18, 2016, pp. 1-2.

Pending U.S. Appl. No. 15/073,805, filed Mar. 18, 2016, titled "Scalable Code Division and Workflow Chart," pp. 1-24.

Caselden et al., "HI-CFG: Construction by Binary Analysis and Application to Attack Polymorphism", ESORICS 2013, LNCS 8134, pp. 164-181.

Jain et al., "Control Flow Graph Based Framework for Effective Evaluation of Source Code", International Journal of Computer Applications (0975-8887), vol. 82—No. 16, Nov. 2013, pp. 15-19.

Gold, "Reductions of Control Flow Graphs", International Scholary and Scientific Research & Innovation 8(3) 2014, pp. 396-403.

Yadegari et al., "A Generic Approach to Automatic Deobfuscation of Executable Code", IEEE Symposium on Security and Privacy, 2015, pp. 674-691.

Jalote et al., "Program Partitioning—A Framework for Combining Static and Dynamic Analysis", ACM, WODA'06, May 2006, pp. 11-16;<https://dl.acm.org/citation.cfm?id=1138916&CFID=999654335&CFTOKEN=49532319>.

Nedhal A. Al-Saiyd, "Source Code Comprehension Analysis in Software Maintenance", IEEE, ICCCS, Jul. 2017, pp. 1-5; <http://ieeexplore.ieee.org/stamp/stamp.jsp ?tp=&arnu mber=80751 75>.

* cited by examiner

SCALABLE CODE DIVISION AND WORKFLOW CHART

BACKGROUND

The present invention relates to the field of software analysis, and particularly to generating a multi-scale workflow chart.

Code analysis techniques involve static analysis of source code without executing the source code. Some static analysis methods require an analysis of the potential execution paths of source code that might be traversed. Workflow charts are often used to represent the execution paths with graph notation. For example, each basic block in the code may be represented as a node in a graph. A control flow graph (CFG) is a well-known tool, widely used in software engineering, which can help programmers to understand the design of a software development project. CFG represents potential execution paths using directed edges connecting basic blocks of source code.

By identifying defects and other properties of source code based on workflow charts, improvements to software reliability can be made in many phases of the software development lifecycle. Analysis of the impact of software defects, for example, has shown potentially high costs associated with memory leaks, deadlocks, and other hazardous program states. In some cases, a small investment in analysis tools earlier in the lifecycle can show dividend gains in the form of lower maintenance costs and prevention of a potentially costly redesign later.

SUMMARY

Embodiments of the present invention disclose a computer-implemented method, system, and computer program product for generating a scalable code division and workflow chart. For a code snippet including a plurality of statements, a definition-and-use case of a variable in the code snippet is obtained. Based on the definition-and-use case of the variable, crossing references associated with at least some of the plurality of statements are determined, where a crossing reference associated with a statement involves a definition of the variable before the statement and a use of the variable at or after the statement. The code snippet is divided, based on the determined crossing references.

BRIEF DESCRIPTION OF THE DRAWINGS

Throughout the drawings, the same or similar reference numerals represent the same or similar elements.

DETAILED DESCRIPTION

Figure 1:
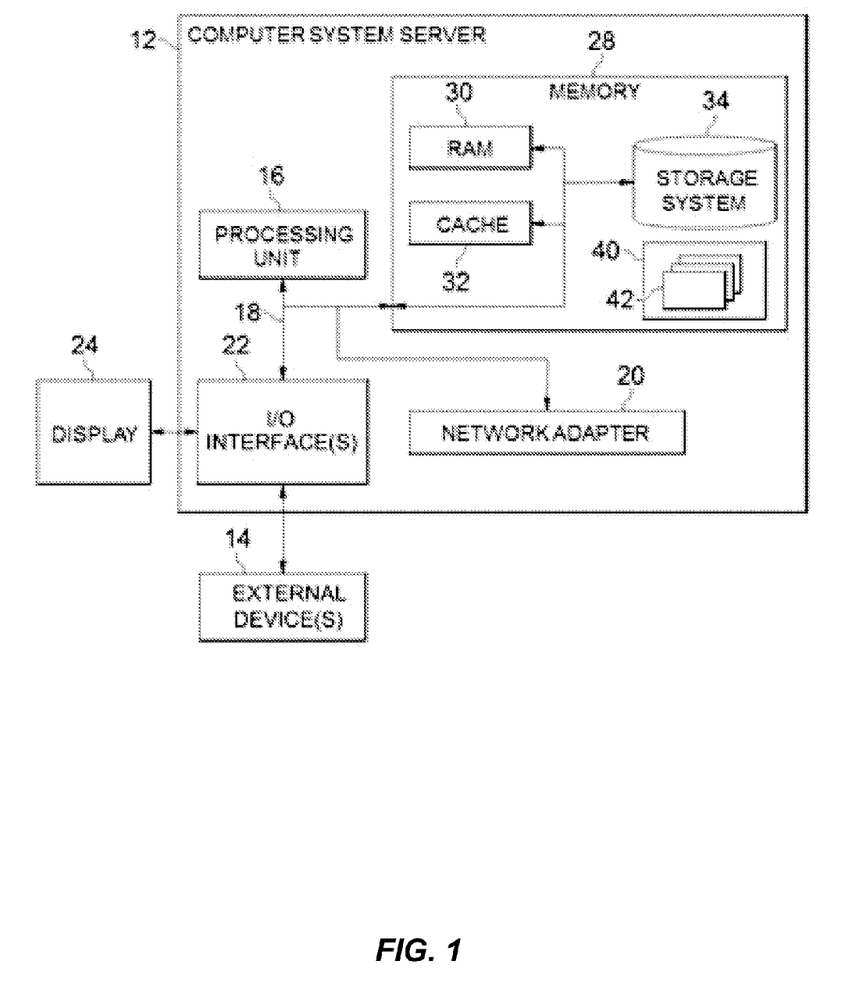
FIG. 1 is a block diagram of a computing device, in accordance with an embodiment of the present invention.

FIG. 1 depicts an exemplary computing device or computer system/server 12, in accordance with an embodiment of the present invention. Computer system/server 12 is only illustrative and is not intended to suggest any limitation as to the scope of use or functionality of embodiments of the invention described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, and the like. One or more devices that enable a user to interact with computer system/server 12; and/or any devices (e.g., network card, modem, etc.) that enable computer system/server 12 to communicate with one or more other computing devices. Such communication can occur via input/output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, and the like.

In computer system/server 12, I/O interfaces 22 may support one or more of various different input devices that can be used to provide input to computer system/server 12. For example, the input device(s) may include a user device such keyboard, keypad, touch pad, trackball, and the like. The input device(s) may implement one or more natural user interface techniques, such as speech recognition, touch and stylus recognition, recognition of gestures in contact with the input device(s) and adjacent to the input device(s), recognition of air gestures, head and eye tracking, voice and speech recognition, sensing user brain activity, and machine intelligence.

Various embodiments of the present invention will be described in the following paragraphs. As described above, workflow charts such as CFGs are often used to represent the execution paths of source code. However, for a large-scale software development project, the conventional CFG may become complex and therefore difficult to read, understand, and use. Moreover, it is difficult to obtain the complete logic and the call relationships from a conventional CFG.

In accordance with embodiments of the present invention, a scalable mechanism for dividing code and generating workflow charts is proposed to overcome the above and other deficiencies. Given a piece of code to be represented by graph, the crossing references to the variables in the code are determined. The crossing references reflect dependencies of variables across different logical units. By dividing the code based on the crossing references, integrity of the logical units may be preserved and the maintainability of the code can be improved. Specifically, the user may be allowed to specify the scale of the code division in the workflow charts. In this way, embodiments of the present invention provide flexibility in presenting different levels of details about the code.

Figure 2:
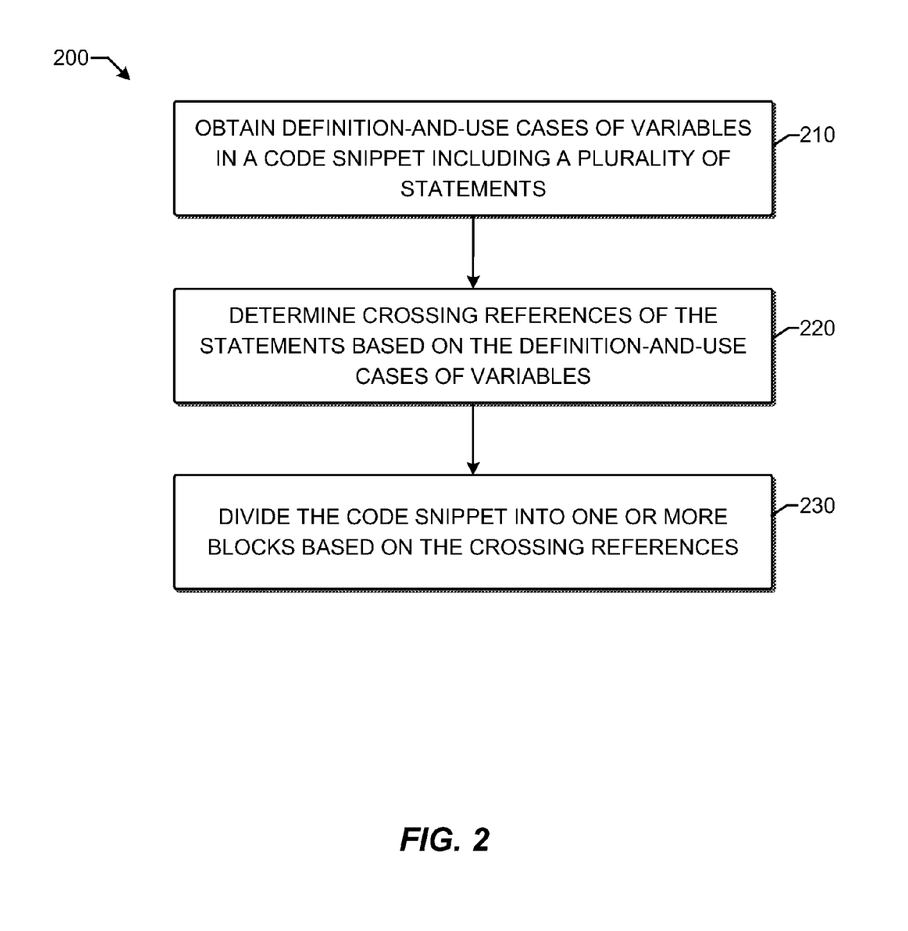
FIG. 2 is a flowchart of a method of scalable code division, in accordance with an embodiment of the present invention.

FIG. 2 shows a flowchart of a method 200 for scalable code division in accordance with embodiments of the present invention. By applying the method 200 on a given code snippet, the code snippet may be divided to one or more blocks. As used herein, a code snippet is a piece of code which includes a plurality of statements. In the context of this disclosure, the code may include source code, pseudo code, and/or code comments.

As shown, the method 200 is entered in step 210, where the definition-and-use cases of one or more variables in the code snippet are determined. In various embodiments, the definition-and-use case of each variable is determined. The definition-and-use case of a variable indicates the definition(s) and use(s) of that variable in the code snippet. Every variable has at least one definition by its declaration or initialization. A definition may have various forms, but is generally taken to mean the assignment of some value to a variable. For example, when the variable appears on the left-hand side of an assignment statement, the statement is a definition of the variable. On the other hand, if the variable appears on the right-hand side of a statement, then there is a use of that variable at this statement.

Figure 3:
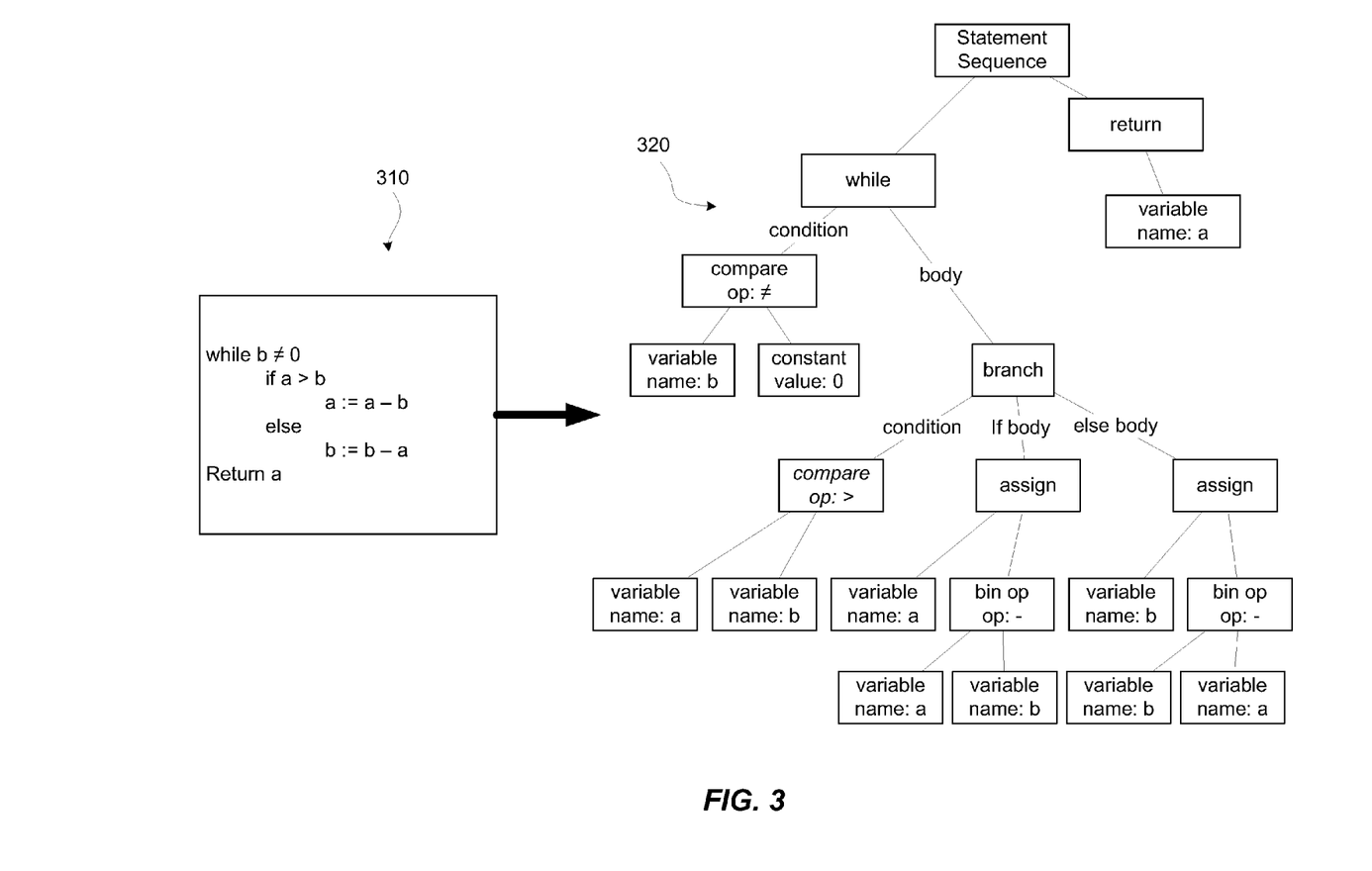
FIG. 3 is a schematic diagram of an abstract syntax tree (AST) of a piece of code, in accordance with an embodiment of the present invention.

In various embodiments, for each of the variables in the code snippet, a use-definition (UD) chain may be generated as the definition-and-use case. The UD chain is a data structure that consists of a use of a variable and all the definitions of that variable that can reach that use without any other intervening definitions. The UD chain for a variable may be generated in a variety of ways. In various embodiments, the UD chain is established by determining the syntactic structure of code included in the code snippet. An example syntactic structure is abstract syntax tree (AST). Each node of the AST denotes a construct occurring in the code. The syntax represented by the AST is "abstract" because the AST does not represent every detail in the real syntax. For instance, grouping parentheses are implicit in the tree structure, and a syntactic construct like an if-condition-then expression may be denoted by means of a single node with three branches. As an example, FIG. 3 shows an AST 320 for a piece of code 310.

As is known, an AST of the code can be generated by a syntax parser. On the AST, variable types as well as the location of each declaration in the code are preserved. In addition, the order of executable statements is explicitly represented and well defined. Left and right components of binary operations are stored and identified. In addition, identifiers and their assigned values are stored for assignment statements. By analyzing the data flow based on the AST, the UD chain for each variable in the code snippet may be established.

It is to be understood that the UD chain does not necessarily have to be established from the AST. In alternative embodiments, a concrete syntax tree or any other suitable parse structure may be utilized to create UD chains for the variables, for example. Moreover, it is to be understood that the definition-and-use cases of variables are not limited to UD chains. For example, in various embodiments, the definition-and-use case can be implemented as a definition-use (DU) chain which is a counterpart of a UD chain. A DU chain for a variable involves a definition of the variable and all the uses reachable from that definition without any other intervening definitions. Similar to UD chains, the DU chains can be generated from the syntactic structure such as the AST. Other suitable forms of definition-and-use cases of variables are possible as well.

In various embodiments, the generated syntactic structure may be attributed. Considering the AST as an example, in one embodiment, each node corresponding to a statement may be tagged with an attribute. The attribute may be assigned with one of two values indicating whether there is a division point immediately after the corresponding statement. For the sake of discussion, it is supposed that the value 0 indicates that there is no division point and value 1 indicates a division point. The attribute for all statements may be initially set to 0. As a result, all the statements together compose a whole block. When a division point is determined later, the associated attribute on the AST can be set to 1.

Referring again to FIG. 2, the method 200 proceeds to step 220. In this step, the crossing references associated with at least some of the statements in the code snippet are determined, based on the definition-and-use cases of variables as obtained in step 210. In various embodiments, the crossing reference(s) associated with each statement is determined in step 220. Alternatively, some statements may be omitted in other embodiments. For example, in view of the fact that the first statement in a code snippet usually has no crossing reference, this statement can be excluded from the processing in step 220.

As used herein, a crossing reference associated with a statement refers to a reference to a variable that appears at or after the statement and such that the variable is defined before the statement. That is, if there is a definition of a variable before a statement and there is a use of that variable at or after the statement, there is a crossing reference associated with that statement. An example will now be described with reference to FIG. 4 which shows a portion of a code snippet 400. In this example, each line corresponds to a statement. In other examples, a statement may span multiple lines. Considering line 20 as an example, the variable alignment is defined before this line and used thereafter. Therefore, there is a crossing reference to the variable alignment at line 20. Additionally, the variable a is defined at line 18 and used at line 20. Therefore, the statement at line 20 is further associated with a crossing reference to the variable a. As another example, at line 24, the variable alignment is syntactically defined at line 21 and it is used at line 24. Although the definition at line 21 may not be true at runtime when the if branch is not taken, a crossing reference may be counted.

In various embodiments, the crossing reference(s) associated with each statement may be determined by checking the definition-and-use cases of variables. For example, in those embodiments where the UD chains of variables are established, a crossing reference at a statement in the code snippet is an element of the UD chain whose use side is at or after the statement and the definition side is before the statement. The crossing references may be recorded in a table or any other suitable forms of structures. Specifically, in various embodiments, unchanged global variables or definitions like MALLOC_ALIGNMENT and variables passed in as parameters of functions may be ignored in determining the crossing references.

Referring back to FIG. 2, the method 200 proceeds to step 230, where the code snippet is divided to one or more blocks based at least in part on the crossing references as determined in step 220. In general, the code division should preserve the property that each block is self-contained and the number of inter-block dependencies is minimized. As used herein, a block refers to a sequence of statements that satisfy the "sequential-after" relationship for each adjacent pair. A second statement is sequential-after a first statement if and only if the second statement can receive control immediately after the first statement. For example, in a routine written in the C/C++ language, a statement B is sequential-after a statement A if and only if B is executed right after A. As another example, if routine A calls routine B, then routine B is sequential-after routine A. As a special case, if routine A calls routine B and then calls routine C after routine B returns and if there is no other call between routines B and C, then routine C is sequential-after routine B.

In order to meet the above requirement, in various embodiments one or more statements are selected based on the counts of the associated crossing references. More particularly, a statement can be selected if the count of crossing references associated with this statement is low enough. In various embodiments, a predefined threshold may be used. If the number of crossing references associated with a statement is below the threshold, the statement can be selected. Alternatively, one or more statements with the minimal number of crossing references may be selected. The position immediately after every selected statement can be determined as a candidate division point. That is, the code snippet can be divided after each selected statement.

In one embodiment, the statement with the least number of crossing references may be selected. For instance, in the example shown in FIG. 4, the statement at line 22 is associated with only one crossing reference to the variable alignment, which is less than the other statements. Therefore, the statement at line 22 may be selected. Accordingly, the position immediately after line 22 is determined as a candidate division point. That is, the code snippet 400 may be divided to two blocks between lines 22 and 23. The selection of candidate division points based on the crossing references ensures that the dependencies of variables across different blocks are minimized, thereby achieving high maintainability of the code.

In various embodiments, the scales of the code division may be specified by a user. As used herein, scale refers to the number of blocks resulting from the code division. In such embodiments, the number of division points is determined by a user-specified scale. For example, if the user specifies that the scale is three, then two division points may be determined. By allowing the user to have a control of the scale, embodiments of the present invention provide flexibility that the user can obtain different levels of detail of the code, which will be discussed in the following paragraphs.

In various embodiments, in addition to the crossing references, one or more other factors may be taken into account in step 230 in dividing the code snippet. For example, in various embodiments, the division points are determined to ensure the integrity of the logical units in the code. As used herein, a logical unit refers to one or more statements in the code that together implement a certain logical function(s). By way of example, a function, procedure, or loop in the code may be considered as a logical unit. In order to ensure the integrity of such logical units, in step 230, the division points may be selected based on the syntactic structure of the code.

For example, in one embodiment, the AST of the statements included in the code snippet is established. As known and shown in FIG. 3, the AST has a root node. The division points may be determined based on the distances from the nodes representing the statements to the root node. In general, if a node is close to the root, then the probability of selecting the corresponding statement as a division point is relatively high. The distance between two nodes on the AST can be measured by the number of edges between the nodes, for example. In one embodiment, it is possible to select one or more nodes whose distances to the root node of the AST are shorter than a predefined threshold distance. In another embodiment, one or more nodes that are closest to the root node of the AST may be selected. As known, the language level syntactic structure captures the basic underlying logic structure and divides the code to rough logical units. The nodes close to the root node corresponds to those "outmost" statements. By selecting the positions immediately after such outmost statements as the divisional points, the logical units in the original code can be well preserved.

In addition, or alternatively, in various embodiments, two or more sequential statements are functionally correlated, although these statements do not constitute a function, a procedure, or a loop. For instance, in the code snippet 400 shown in FIG. 4, the statements at lines 24 to 27 are cross-referencing the same variables alignment, nb, and m. These statements together complete a task of building a pointer to piece memory and then checking the values. Such a collection of statements may be identified based on the crossing references. That is, if two or more sequential statements have the same variable or function references, then those statements may be identified as a functional unit and therefore should not be broken in the code division. This rule ensures that the code division in step 230 conforms to the Principle of Locality. Moreover, this would beneficial to meet some particular programming needs. For example, a programmer may write a serials of printf( ) functions to format a data structure, and those printf( ) functions should be grouped together.

These and possibly other rules may be used in combination with the crossing references in any suitable ways. For example, in various embodiments, the outmost statements may be first selected. Then one or more division points are selected from these outmost statements based on the counts of the crossing references. Alternatively, in other embodiments, it is possible to first select the statements with the least number of the crossing references. Then according to the scale, for example specified by the user, one or more outmost statements may be picked up to determine the division point.

Figure 4:
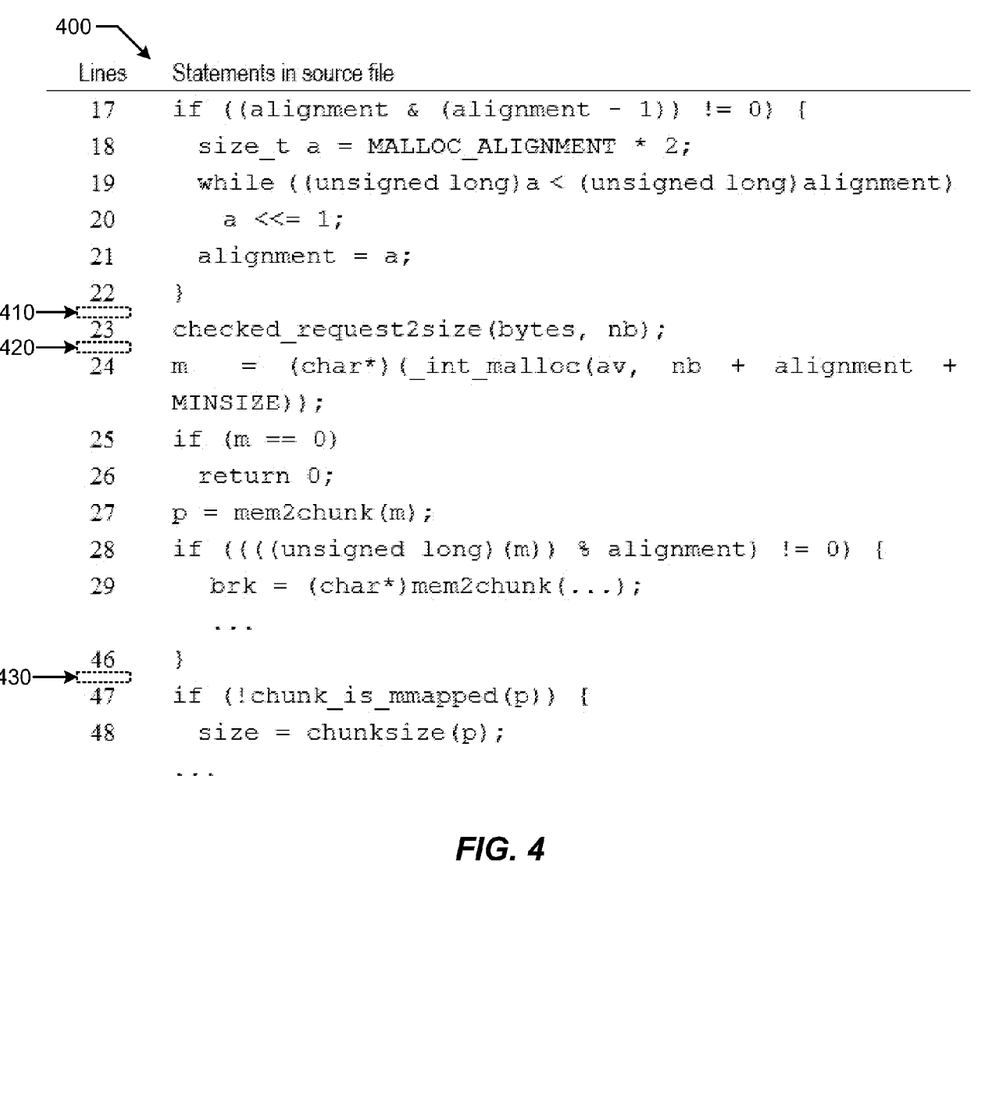
FIG. 4 is a schematic diagram of code snippet and division points that are determined in accordance with an embodiment of the present invention.

By way of example, for the code snippet 400 shown in FIG. 4, it is determined the statements at lines 17, 18, and 22 all have only one crossing reference. It is further determined from the syntactic structure such as the AST that the statement at line 22 is the outmost one out of these three statements. By applying these two rules in combination, the position immediately after the statement at line 22 may be selected as a division point. It is supposed that the scale specified by the user is four. In this way, the positions 410, 420, and 430 in the code snippet 400 will be selected as three division points.

Figure 5A:
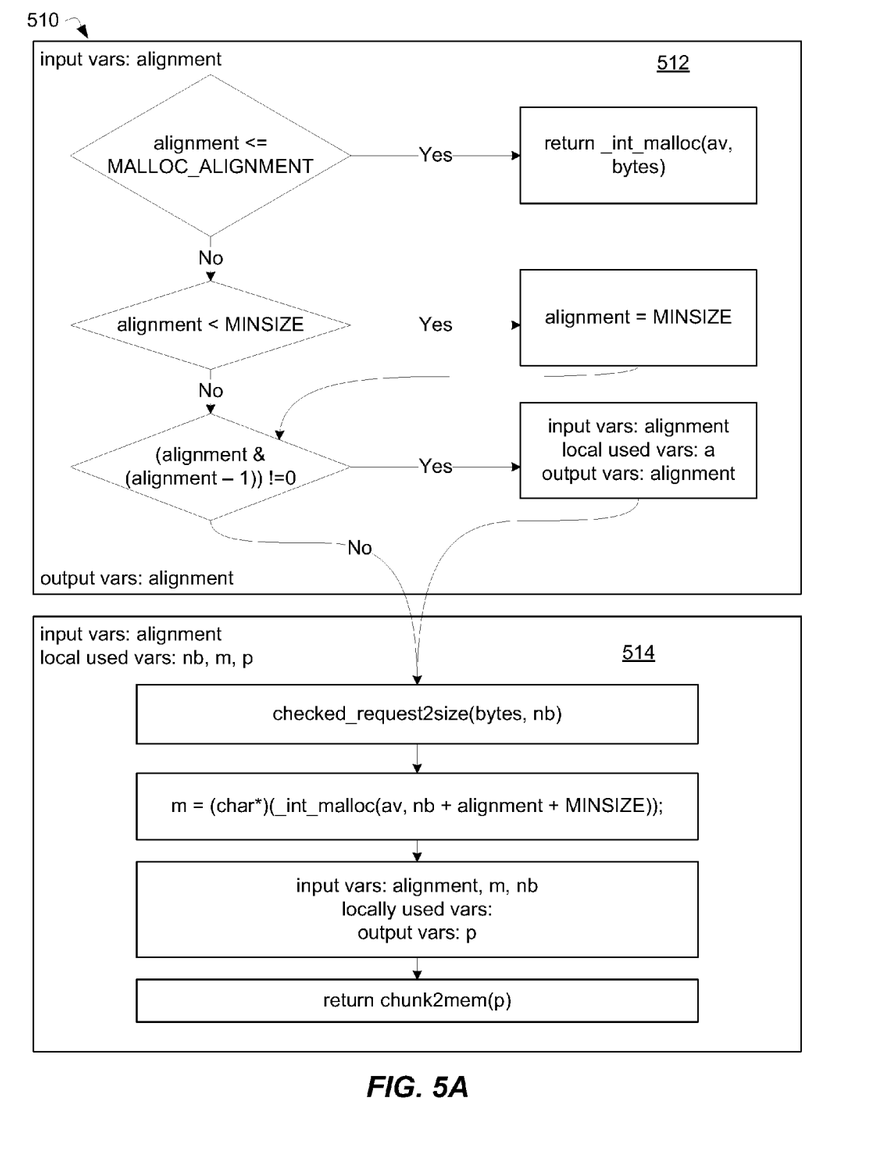
FIG. 5A and FIG. 5B are multi-scale workflow charts with different scales, in accordance with an embodiment of the present invention.
Figure 5B:
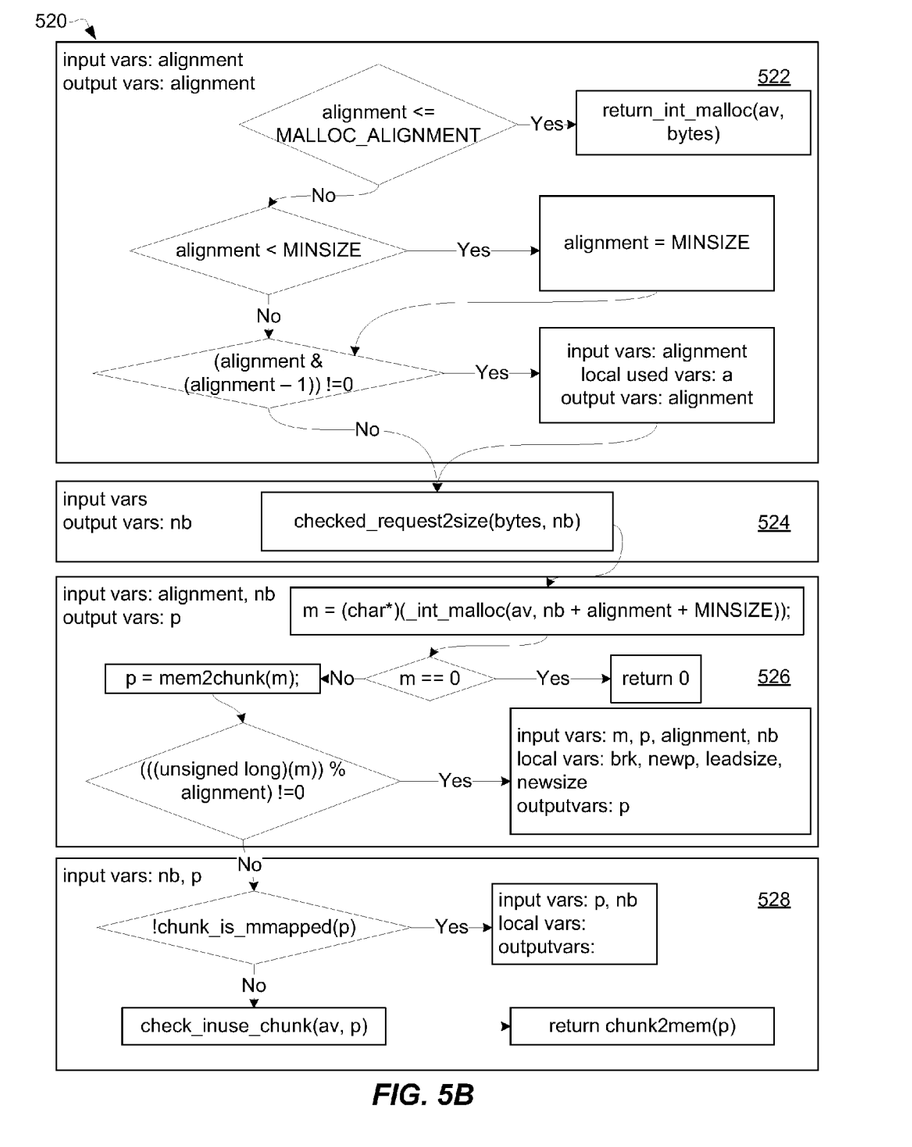

In accordance with embodiments of the present invention, the blocks resulting from the code division in step 230 may be displayed as a workflow chart. In various embodiments, each block may be displayed as a separate graph such as a CFG. Different CFGs corresponding to different blocks may be connected by edges according to the original control flow information between those CFGs. FIGS. 5A and 5B show two examples of the multi-scale workflow charts obtained by applying the method 200 on the code snippet 400. The scale for the workflow chart 510 shown in FIG. 5A is two, while the scale for the workflow chart 520 shown in FIG. 5B is four. In the shown examples, each block is shown as a CFG that is rendered as within a rectangle. In the workflow chart 510, CFGs 512 and 514 correspond to the resulting two blocks, respectively. Likewise, the workflow chart 520 includes CFGs 522, 524, 526, and 528 corresponding to the four resulting blocks, respectively.

Moreover, in the embodiments, each CFG presents the variables carrying input, the variables carrying output and those variables that are only used locally inside the block. In fact, in various embodiments, if a block is relatively complex, the corresponding workflow charts may only show some basic control flow and data flow. For those relatively small blocks, the corresponding workflow charts can give more details about the underlying logic of the code. The complexity of a block can be measured in a variety of ways. For example, the complexity of a block may be determined based on the number of statements included in the block. In this way, the user can control the multi-scale workflow chart in a flexible way. If the user wants to have an overall sense of the code, he/she may specify a smaller scale. Later, the user can get more details by increasing the scale.

In various embodiments, the code division will continue until the complexity of each resulting code block is below a predefined threshold complexity. Specifically, as mentioned above, in various embodiments, the scale of the code division and the workflow chart is specified by the user. However, sometimes one or more of the resulting blocks are too complex to be displayed within a single CFG. To deal with this situation, in various embodiments, if the complexity of a block exceeds a predefined threshold, then the block may be further divided to a plurality of sub-blocks until the complexity of each sub-block falls below the threshold. For example, the method 200 may be applied automatically. In this way, it is ensured that each graph in the workflow chart fits the visual area well.

In the above discussions, various embodiments are discussed, where the scale of the code division and the workflow chart is specified by the user. It is to be understood that the user-specified scale is described merely for the purpose of illustration, without suggesting any limitations as to the scope of the invention. In other embodiments, for example, the scale can be automatically determined, for example, based on the size of the code snippet. Alternatively, it is also possible to set the scale to a predefined, constant value.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In various embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer system comprising:
one or more computer processors, one or more computer-readable storage media, and program instructions stored on one or more of the computer-readable storage media for execution by at least one of the one or more processors, the program instructions comprising:
program instructions to receive a code snippet that includes a plurality of statements;
program instructions to determine for each variable in the code snippet, all use-definition (UD) chains, wherein a UD chain of a variable begins at a statement in the code snippet that defines a variable by assigning a value to the variable and includes all subsequent statements in the code snippet that use the variable without any intervening further definitions of the variable;
program instructions to determine, for each statement of the code snippet within each UD chain, all variable crossing references associated with the statement, wherein a variable crossing reference indicates that the variable is defined before the statement and a use of the variable occurs at or after the statement;
program instructions to determine division points in the code snippet by identifying statements in the code snippet for which the number of variable crossing references associated with the statement is less than a predefined threshold number, wherein the division points are the position in the code snippet immediately after the identified statements; and
program instructions to divide the code snippet into two or more blocks at one or more of the determined division points.

2. A computer system in accordance with claim 1 wherein program instructions to determine for each variable in the code snippet, all use-definition (UD) chains comprise:
program instructions to determine a syntactic structure of the plurality of statements included in the code snippet; and program instructions to determine the UD chains of the variable from the syntactic structure.

3. A computer system in accordance with claim 1, further comprising:
program instructions to determine logical units in the plurality of statements, wherein a logical unit is one or more statements in the plurality of statements that implement an individual logical function, and
wherein program instructions to divide the code snippet further comprise program instructions to divide the code snippet based on integrity of the logical units.

4. A computer system in accordance with claim 3, wherein program instructions to determine the logic units comprise program instructions to determine a syntactic structure of the plurality of statements, the syntactic structure including a root node, and
wherein program instructions to divide the code snippet based on the integrity of the logical units comprise:
program instructions to select a statement from among the plurality of statements, wherein a node corresponding to the selected statement on an abstract syntax tree of the code snippet is close to the root node; and
program instructions to determine a position immediately after the selected statement as a candidate division point for the dividing.

5. A computer system in accordance with claim 3, wherein program instructions to determine the logic units comprise:
program instructions, in response to determining that two or more sequential statements of the plurality of statements have references to a same variable or function, to identify the two or more sequential statements as a logical unit.

6. A computer system in accordance with claim 1, wherein program instructions to divide the code snippet comprise:
program instructions to divide the code snippet into a number of blocks according to a scale that is specified by a user.

7. A computer system in accordance with claim 1, wherein program instructions to divide the code snippet comprise:
program instructions to divide the code snippet into blocks so that a complexity of each of the blocks is below a predefined threshold.

8. The computer system of claim 1, wherein the code snippet is divided into a plurality of blocks, the program instructions further comprising:
program instructions to display the plurality of blocks in a workflow chart, wherein each of the plurality of blocks is rendered as a graph in the workflow chart; and
program instructions to connect the graphs according to a control flow of the plurality of blocks.

* * * * *